(12) United States Patent
Brinkmann et al.

(10) Patent No.: US 11,338,792 B2
(45) Date of Patent: May 24, 2022

(54) HYBRID VEHICLE AND METHOD FOR ADAPTING A POWER LIMITATION OF AN INTERNAL COMBUSTION ENGINE

(71) Applicant: FORD GLOBAL TECHNOLOGIES, LLC, Dearborn, MI (US)

(72) Inventors: Bernd Brinkmann, Dormagen (DE); Nicholas Dashwood Crisp, Benfleet (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 246 days.

(21) Appl. No.: 16/849,419

(22) Filed: Apr. 15, 2020

(65) Prior Publication Data

US 2020/0339102 A1  Oct. 29, 2020

(30) Foreign Application Priority Data

Apr. 29, 2019 (DE) .......................... 102019206127.3

(51) Int. Cl.
*B60W 20/15* (2016.01)
*B60W 10/06* (2006.01)
(Continued)

(52) U.S. Cl.
CPC ............ *B60W 20/15* (2016.01); *B60W 10/06* (2013.01); *B60W 10/08* (2013.01); *B60W 10/26* (2013.01);
(Continued)

(58) Field of Classification Search
CPC ......... B60K 6/46; B60W 10/06; B60W 10/08; B60W 10/26; B60W 20/15;
(Continued)

(56) References Cited

U.S. PATENT DOCUMENTS

| 6,065,446 A | 5/2000 | Engl et al. |
| 2005/0203694 A1 | 9/2005 | Baldauf et al. |

(Continued)

FOREIGN PATENT DOCUMENTS

DE   102015213639 A1   11/2016

OTHER PUBLICATIONS

DE Examination Report DE 10 2019 206 127.3 Filed Jan. 13, 2020, 7 pages.

*Primary Examiner* — Tyler J Lee
*Assistant Examiner* — Yufeng Zhang
(74) *Attorney, Agent, or Firm* — Brooks Kushman PC; David Kelley

(57) ABSTRACT

A vehicle and method for controlling a vehicle having a traction battery and an internal combustion engine include adapting a power limitation of the internal combustion engine by sensing a currently supplied power level of the internal combustion engine and a current velocity of the vehicle, sensing an ambient temperature of the vehicle and determining an associated ambient-temperature-related weighting factor, sensing an ambient air pressure and determining an associated air-pressure-related weighting factor, determining a thermal load indicator as a function of a ratio of the sensed currently supplied power and the sensed current velocity as well as of the ambient-temperature-related weighting factor, the air-pressure-related weighting factor, and a vehicle-bodywork-related weighting factor, and limiting a maximum supplied power level of the internal combustion engine as a function of the determined thermal load indicator.

18 Claims, 2 Drawing Sheets

(51) Int. Cl.
*B60W 10/08* (2006.01)
*B60W 10/26* (2006.01)

(52) U.S. Cl.
CPC . *B60W 2510/0666* (2013.01); *B60W 2520/00* (2013.01); *B60W 2555/20* (2020.02)

(58) Field of Classification Search
CPC . B60W 2050/0025; B60W 2050/0027; B60W 2050/0052; B60W 2510/0638; B60W 2510/0661; B60W 2510/0666; B60W 2520/00; B60W 2520/10; B60W 2555/20; B60W 2710/0677; B60W 30/1843; B60W 50/038; Y02T 10/62
See application file for complete search history.

(56) References Cited

U.S. PATENT DOCUMENTS

| | | | |
|---|---|---|---|
| 2015/0025721 A1* | 1/2015 | Thompson | B60W 10/26 |
| | | | 701/22 |
| 2017/0298811 A1 | 10/2017 | Santillo et al. | |
| 2018/0222596 A1* | 8/2018 | Lisio | B64D 27/10 |
| 2019/0032774 A1* | 1/2019 | Yoshikawa | B60W 10/115 |

\* cited by examiner

US 11,338,792 B2

HYBRID VEHICLE AND METHOD FOR ADAPTING A POWER LIMITATION OF AN INTERNAL COMBUSTION ENGINE

CROSS-REFERENCE TO RELATED APPLICATIONS

This application claims foreign priority benefits under 35 U.S.C. § 119(a)-(d) to DE Application 10 2019 206 127.3 filed Apr. 29, 2019, which is hereby incorporated by reference in its entirety.

TECHNICAL FIELD

This disclosure relates to a hybrid vehicle and method for adapting a power limitation of an internal combustion engine of a hybrid vehicle.

BACKGROUND

A hybrid vehicle, i.e. a hybrid electric motor vehicle, is a vehicle whose drive system has at least one electric motor and one other energy converter such as an internal combustion engine, for example a spark ignition engine or a diesel engine.

Modern motor vehicles frequently have a very high efficiency level connected with the generation of a large amount of heat along with a simultaneously very compact design, i.e. narrow, space-saving arrangement of the vehicle components in the engine compartment and under the vehicle floor. In addition, relatively high temperatures are necessary in the exhaust system of the internal combustion engine to comply with reduced emission limiting values. This can potentially give rise to high temperature situations during travel, but also when idling. In particular, when an internal combustion engine is operating, hybrid vehicles can generate particularly high temperatures, e.g. readily over 100 degrees Celsius more than vehicles which are driven only with an internal combustion engine. When idling or stationary, hybrid vehicles may draw a large amount of power from the internal combustion engine to drive a generator or to operate the electric motor as a generator e.g. to charge the battery, i.e. the accumulator or electric energy store, to supply auxiliary systems and comfort systems of the vehicle with energy, such as the compressor of an on-board air-conditioning system, for example. In addition, the energy demand also tends to rise even further in the stationary state owing to additional new comfort functions.

To avoid adverse effects of overheating of components or areas of the vehicle, it is possible, for example, for additional cooling to be carried out by means of fans, the use of which could be controlled by measurements or on the basis of a modeled temperature profile at the exhaust train during cooling phases of the internal combustion engine. However, this itself generates additional energy consumption. Instead, it is also possible to attempt to reduce the demand for power to be supplied for comfort functions or to reduce the charging of the battery, i.e. of the accumulator, of the hybrid vehicle. However, for example the reduction of the power level which is supplied for the air-conditioning system is also disadvantageous at high temperatures at which this would have the greatest effect, since owing to the relatively small difference with respect to the ambient temperature, overheating of a vehicle component is more likely than at relatively low temperatures. Alternatively or additionally, the charging of the battery could also be limited, or discharging could even be accepted. Controlling which measure is suitable and when the available power level is not used to an optimum degree as a result of unnecessary limitation on the basis of individual measurements of, for example, the temperature at the exhaust train of the internal combustion engine is often less than optimum.

Instead of generating additional energy consumption through the use e.g. of fans, it would be possible to avoid overheating situations by limiting the supplied power level of the internal combustion engine wherein control can be carried out e.g. also solely on the basis of the temperature profile for example at the exhaust train. Existing strategies appear to provide inadequate sensing so that either overheating problems could still occur or the engine power is limited unnecessarily.

SUMMARY

Various embodiments according to the disclosure provide a strategy for avoiding undesirable thermal situations in a hybrid vehicle while mitigating any reduction in efficiency of the hybrid vehicle.

According to a first aspect, a method for adapting a power limitation of an internal combustion engine of a hybrid vehicle comprises sensing a currently supplied power level of the internal combustion engine P of the hybrid vehicle and a current velocity V of the hybrid vehicle. In addition, an ambient temperature $T_{env}$ of the hybrid vehicle is sensed, and an associated weighting factor $G_t$ is determined, as well as an air pressure $Pr_{env}$ in the surroundings of the hybrid vehicle is sensed, and an associated air-pressure-related weighting factor $G_p$ is determined.

On this basis, a thermal load indicator STC is determined as a function of a ratio $R_{pv}$ of the sensed currently supplied power level and of the sensed current velocity V as well as of the ambient-temperature-related weighting factor $G_t$, the air-pressure-related weighting factor $G_p$ and additionally of a vehicle-bodywork-related weighting factor $G_k$. A maximum supplied power level $P_{max}$ of the internal combustion engine is then limited as a function of the determined thermal load indicator STC.

The currently supplied power level of the internal combustion engine P may be sensed directly at the internal combustion engine, e.g. on the basis of a measurement of torque and the rotation speed of a crankshaft driven directly by the engine. If a generator is driven by the internal combustion engine, the supplied power level of the internal combustion engine can also be sensed indirectly as the electrical output power of the generator, in particular when the entire power level of the internal combustion engine is used exclusively to drive the generator. This is the case, for example, in internal combustion engines which are provided as range extenders and which increase the range of the electric drive of the hybrid vehicle in that the driven generator supplies electrical power to a battery, i.e. an accumulator, and the electric motor of the hybrid vehicle. The current velocity V of the hybrid vehicle is the longitudinal speed with which the hybrid vehicle moves forward, irrespective of whether the electric motor, the internal combustion engine or the drive units of the hybrid vehicle are idling or are contributing to driving the hybrid vehicle. The level of the supplied power level depends mainly on the extent of the heat generated by the operation of the internal combustion engine. However, at the same time the ability to discharge heat through air cooling is influenced significantly by the magnitude of the velocity V and the exchange of air which is therefore possible.

The effect of the exchange of air on the vehicle components which heat up is in turn additionally influenced by the temperature difference which is present with respect to the ambient air, which is taken into account by the ambient-temperature-related weighting factor $G_t$. In addition, the magnitude of the air pressure $Pr_{env}$ in the surroundings of the hybrid vehicle also influences the ability to exchange heat, which is taken into account by the air-pressure-related weighting factor $G_p$. Finally, the design of the vehicle is taken into account. Depending on how compactly the heat-conducting components are installed and by which surface cooling is made possible, a rise in temperature gives rise to a greater or lesser extent of thermal loading. This relationship is taken into account by the additional vehicle-bodywork-related weighting factor $G_k$.

In this way, the operating state, the operating situation determined by the surroundings and the design of the hybrid vehicle are included in the determination of the thermal load indicator STC, wherein account is taken of the fact that the various factors also influence one another in terms of their meaning, which would be ignored if only one parameter or only one component of the vehicle, for example only the change in temperature in the exhaust system, would be taken into account. In addition, the thermal load indicator STC (STC standing for "Severe Temperature Condition") can be determined for the hybrid vehicle at any time, i.e. even for phases in which the internal combustion engine is not yet operating or is no longer operating. Therefore, a parameter is made available which can be used to control whether, and to what degree, the maximum supplied power level is to be limited so that the individual components remain within their thermal limiting values.

While current characteristic values of the hybrid vehicle and of the surroundings, for example the velocity V, the ambient temperature $T_{env}$ or the air pressure $Pr_{env}$ are acquired with suitable sensors of the vehicle, the other steps of the method, in particular the determination of the thermal load indicator STC may be carried out by an electronic control unit or other programmable device at least with a non-transitory or physical memory and processor as computer-implemented method steps, wherein the memory contains program code which, when loaded and executed by the processor causes the processor to execute the corresponding method steps.

The determination of the thermal load indicator STC may be carried out continuously or at regular intervals so that the limitation of the maximum supplied power level $P_{max}$ can be correspondingly updated. In one embodiment, a function or assignment rule with which suitable $P_{max}$ values are assigned to the STC values, can be determined individually for the type of hybrid vehicle on the basis of test series. In a further embodiment there is provision that $P_{max}$ is linearly dependent on the square root of the mean value of the sum of the squares of the STC values over a time window of a specific length (i.e. RMS (Root Mean Square)). Limitation of a battery current of a hybrid vehicle can also be determined in a similar way. In one embodiment, $P_{max}$ is determined using a lookup table in which the assignment of $P_{max}$ values to STC values is stored.

If a new value for the permissible maximum supplied power level $P_{max}$ which is exceeded by the previous value for $P_{max}$ is determined during operation, the currently supplied power level P may be reduced until it is no longer more than the newly determined permissible maximum supplied power level $P_{max}$.

In various embodiments, active cooling measures are controlled as a function of the determined thermal load indicator STC. In one embodiment, an activation time and/or an activation period and/or a rotational speed of one or more fans of a cooling system for components of the hybrid vehicle is controlled as a function of the profile of the STC value. This may be done, for example, at least in a cooling phase of the internal combustion engine.

In various embodiments, determination of the thermal load indicator STC comprises determining STC as $STC=R_{pv}*G_k*G_t*G_p$, i.e. as the ratio $R_{pv}$ of the sensed, currently supplied power level P and of the sensed current velocity V weighted with the product of the ambient-temperature-related weighting factor $G_t$, of the air-pressure-related weighting factor $G_p$ and of the vehicle-bodywork-related weighting factor $G_k$.

In various embodiments, the ratio $R_{pv}$ between the sensed, currently supplied power level P, specified in kilowatts, and the sensed current velocity V, specified in kilometers per hour, comprises determining $R_{pv}$ as $R_{pv}=P^{K1}(V-K2)$, at least if V is higher than or equal to a lower limiting speed $V_{th}$, wherein K1 is a first constant factor in a range from 1 to 2, and K2 is a second constant factor which is higher than 0 and lower than $V_{th}$ and specified in kilometers per hour.

K1 weighs the influence of the currently supplied power level of the internal combustion engine. Here, account is taken of the fact that high power levels cause high temperatures, wherein a system which is already heated heats up further to a disproportionately greater extent if the supplied power level is increased further. In one embodiment, the first constant factor K1=1.6, i.e. the fifth root is formed to the power of eight. In at least one embodiment there is provision that instead of $P^{K1}$ being calculated on an up-to-date basis, a look-up table is provided for the selected first constant factor K1, e.g. 1.6, in which look-up table the assignment of $P^{K1}$ values to P values is stored.

K2 describes an upper limit of a speed range in which the hybrid vehicle is traveling very slowly and the influence of the speed being traveled on the air cooling is still very low. $V_{th}$ therefore defines a lower limiting value above K2 for the velocity, up to which the influence of the velocity is taken into account as stated. In other embodiments, one or more of the specified units is/are selected differently. Then, under certain circumstances, the value ranges of the constants also change correspondingly. Conversion into the units specified here is carried out in advance to permit comparability.

In one embodiment, the determination of the ratio $R_{pv}$ of the sensed, currently supplied power level P and of the sensed current velocity V comprises determining $R_{pv}$ as $R_{pv}=P^{K1}/(MAX(V, V_{th})-K2)$. Therefore, there is provision for the velocity V to be reduced to $V_{th}$ so that even at creeping pace or even when the hybrid vehicle is stationary the denominator of $R_{pv}$ can never be lower than $V_{th}-K2$ and e.g. measuring inaccuracies cannot bring about division by zero or highly falsified values for $R_{pv}$. In this embodiment or in a further embodiment, the second constant factor K2 can be, for example, 15 kilometers per hour. $V_{th}$ is then selected as at least 16 kilometers per hour, and in at least on embodiment, 17 kilometers per hour. In yet a further embodiment, $V_{th}$ is not selected but rather defined as a function of K2, for example $V_{th}=K2+2$ or $V_{th}=K2*2$, in each case in kilometers per hour.

In various embodiments, the vehicle-bodywork-related weighting factor depends on a surface of a front area of the hybrid vehicle. The front area is the area in front of the passenger cabin of the hybrid vehicle, that is to say in many vehicles the area in which the engine hood of the vehicle is located; wherein the surface of the front area is always assumed to be at least one square meter, even if the engine or the engines are arranged under the passenger compartment or behind it. The term surface includes all surfaces, that is to say for example all lateral surfaces. The surface of the front area constitutes an indicator of the type and compactness of the design of the drive system of the vehicle and therefore also of its heating behavior and cooling behavior, wherein approximate determination of the surface can be carried out with simple means, and actual detection of the temperature behavior of the components which heat up and cool down again under the surface can be avoided. In one representative embodiment, the vehicle-bodywork-related weighting factor $G_k=1/A$, wherein A is a constant in the range from 1 to 10 specified in square meters. Therefore, the greater the surface A, the smaller the influence of the design on the thermal load of the hybrid vehicle.

In one embodiment, the determination of the ambient-temperature-related weighting factor comprises determining $G_t$ as $G_t=((T_{env}+40)/K3)^2$ wherein $T_{env}$ is the ambient temperature in degrees Celsius, and K3 is a third constant factor which is greater than 60 and lower than 80. The influence of the ambient temperature on the thermal load of the vehicle increases quadratically with the rise in the temperature, wherein K3 lies, for example, in a range which corresponds to more than twice the temperature of a warm summer day in the region in which the hybrid vehicle is being operated. In one embodiment, the third constant factor is K3=70.

In one embodiment of the method, the determination of the air-pressure-related weighting factor comprises determining $G_p$ as $G_p=K4/Pr_{env}$, wherein $Pr_{env}$ is the air pressure in the surroundings of the hybrid vehicle in millibars, and K4 is a fourth constant factor which is greater than 900 and less than 1100. $G_p$ and therefore its influence on the magnitude of the thermal load indicator SIC increases as the air pressure $Pr_{env}$ decreases. This takes into account the fact that cooling as a result of an exchange of heat with the ambient air is more difficult or takes longer at a relatively low air pressure. Typically, the method additionally provides checking with which very small values of $Pr_{env}$ or the value zero are prevented, since these values tend to indicate a sensor anomaly rather than a low air pressure. In one embodiment, the fourth constant factor K4=995 (in millibar) and is therefore slightly lower than the average air pressure of the atmosphere at sea level. A millibar corresponds to a hectopascal.

In one embodiment, the determination of the thermal load indicator STC comprises mean value filtering during which the thermal load indicator STC is filtered by sliding averaging over a time window. The time constant, i.e. the length of the time window over which averaging is carried out, may be selected in a range from 60 to 900 seconds, for example 180 seconds. In this context, the mean value for SIC over the time window is determined continuously or, for example, with a cycle of e.g. 1 second. Values for the filtered thermal load indicator lie, for example, in a range from 1 to 10, wherein relatively high values represent a relatively high thermal load and are therefore worse than low values. The STC value is an energy density indicator. In one embodiment there is provision that starting from a limiting value for the thermal load indicator STC, a warning is additionally output to the driver, for example visually by means of a display on the dashboard or as an audio signal, wherein the warning can be tied to an automatic reduction in the current power level P of the internal combustion engine.

In addition, when the maximum supplied power level is limited, the tendency of change in the thermal load indicator STC can be taken into account as a function of the thermal load indicator STC, wherein an increase in the STC value is evaluated differently than a drop.

In one embodiment, the mean value filtering is continued while the internal combustion engine is switched on as well as off. In this way, the thermal load indicator STC is continuously adjusted and updated, also, for example, in run-on phases and cooling phases.

In one embodiment of the method, the method also comprises limiting the currently supplied power level P of the internal combustion engine as a function of a permitted upper limiting value for the current velocity V of the hybrid vehicle. The currently supplied power level P is limited here not only as a function of the thermal load indicator STC but also additionally as a function of the current velocity V at which the vehicle is traveling. In this context, the power level P is also limited when the set, permitted upper limiting value for V is exceeded. In a further embodiment, the limiting of a maximum supplied power level of the internal combustion engine comprises additionally increasing the influence of the current velocity V of the hybrid vehicle on the maximum supplied power level of the internal combustion engine as the current velocity V rises. In this way it is taken into account that at very high speeds the temperatures rise very strongly, which, under certain circumstances, can be sensed and reduced more quickly by taking into account the speed directly or to a greater extent, than by taking into account the STC value only. Therefore, the overall situation of the vehicle is taken into account to a greater extent for a relatively low speed so that as far as possible a situation can be avoided in which the power level is unnecessarily reduced while at high speeds the temperature load can be reduced quickly and effectively by limiting the power level.

In a further embodiment, the method also comprises limiting an electrical power level supplied by means of a generator, operated by the internal combustion engine of the hybrid vehicle. Therefore, the supplied power level can be limited directly for the receiver units of the electrical power level. A receiver unit for electrical power is here, in particular, a consumer of electrical energy, for example the air-conditioning system or a direct current converter which supplies, e.g. other comfort systems but also the battery of the hybrid vehicle which is to be charged by the operation of the internal combustion engine.

In one embodiment, in this context the generator makes available electrical power to a multiplicity of receiver units, and the limiting of the supplied electrical power level comprises limiting just one overall sum of the electrical power level supplied for the multiplicity of receiver units. Therefore, the use of the supplied power level P can be improved. If the comfort systems currently require less power, this can be used additionally for charging the battery, i.e. the accumulator. In one embodiment there is provision additionally to maintain a desired minimum charge of the battery, if appropriate also at the cost of the power which is available for other receiver units.

In a further embodiment, the method also comprises sensing a coolant temperature of the hybrid vehicle and limiting the maximum supplied power level of the internal combustion engine also as a function of the sensed coolant temperature, and/or sensing a torque of the internal combustion engine and limiting the maximum supplied power level of the internal combustion engine also as a function of the sensed torque. The measured values for the coolant temperature and/or the torque are, under certain circumstances, already available, since these parameters are possibly already used to control fans for cooling.

In a further embodiment, the method also comprises sensing a temperature (EPAS temperature) at an electrically operated power steering system (EPAS, Electrical Power Assisted Steering) and limiting the maximum supplied power level of the internal combustion engine also as a function of the sensed EPAS temperature. This provides the advantage that the EPAS temperature can already be retrieved via an on-board network of the motor vehicle, e.g. the CAN (Controller Area Network) bus.

In yet a further embodiment, it is additionally taken into account whether there was a large rise in the retrieved power in a short monitoring time period (for example summing over a sliding time window).

According to a second aspect, a hybrid vehicle comprises an accumulator; an electric motor, connected to the accumulator and configured to drive the hybrid vehicle; a generator connected to the accumulator; an internal combustion engine connected at least to the generator and configured at least to operate the generator to charge the accumulator; a multiplicity of sensors at least for sensing a currently supplied power level of the internal combustion engine P, a current velocity V of the hybrid vehicle, an ambient temperature $T_{env}$ of the hybrid vehicle and an air pressure $Pr_{env}$ in the surroundings of the hybrid vehicle; and an electronic control unit, characterized in that the electronic control unit is configured to carry out a method according to the first aspect of the invention. In this context, carrying out the steps of the method comprises causing said steps to be carried out either by the electronic control unit itself or causing other components of the hybrid vehicle to carry out the respective step, for example to acquire sensor signals with the sensors. Therefore, the advantages and particular features of the method according to the invention for adapting a power limitation of an internal combustion engine of a hybrid vehicle are also implemented within the scope of a hybrid vehicle.

The electronic control unit is a programmable device at least with a memory and a processor, wherein pieces of code are stored in the memory and when they are loaded by the processor and executed cause the processor to carry out the control of the method etc. Furthermore, for example the constants K1 to K4, if appropriate $V_{th}$, and a suitable assignment rule or assignment table (i.e. lookup table) for quickly assigning $P_{max}$ values to STC values and, if appropriate, an assignment table of $P^{K1}$ values to P values can also be stored in the memory. In one embodiment, in addition a user interface is provided via which a user, e.g. the driver of the hybrid vehicle or a workshop employee, can himself configure and change the constants and, if appropriate, also the assignment rule.

In one embodiment, the hybrid vehicle has, in particular, one or more additional power receiver units which require a supply of electrical power even when the vehicle is stationary. In one embodiment, the hybrid vehicle also has a power-to-the-box function in which the hybrid vehicle provides the energy to supply electrical energy to further power consumers which are connected, for example, to the power system of the vehicle via power connections which are made available on the bodywork. Depending on the magnitude of the requested electrical power this can, in certain circumstances, result in high loading on the internal combustion engine in order to generate sufficient electrical energy by operating the generator without (excessively) discharging the vehicle battery. For example there can be provision to make available up to 8 kilowatts of electrical power via the power-to-the-box function, which, even in a stationary state, requires a correspondingly high power level of the internal combustion engine and causes heat to be correspondingly generated and the thermal load indicator STC to rise.

According to a third aspect, a computer program product comprises pieces of code for executing steps of a method according to the first aspect when it is executed on a programmable device. Therefore, the advantages and particular features of the method according to the invention for adapting a power limitation of the internal combustion engine of a hybrid vehicle are also implemented within the scope of a suitable computer program product.

Further advantages of various embodiments are apparent from the detailed description and the figures. Representative embodiments of the claimed subject matter are explained below in more detail in relation to the appended figures.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Of course, other embodiments can be used and structural or logical amendments can be performed without deviating from the claimed subject matter. Of course, the features of the various embodiments which are described above and below can be combined with one another unless specifically stated otherwise. The description is therefore not to be interpreted in a restrictive sense, and the scope of protection is defined by the appended claims.

Figure 1:
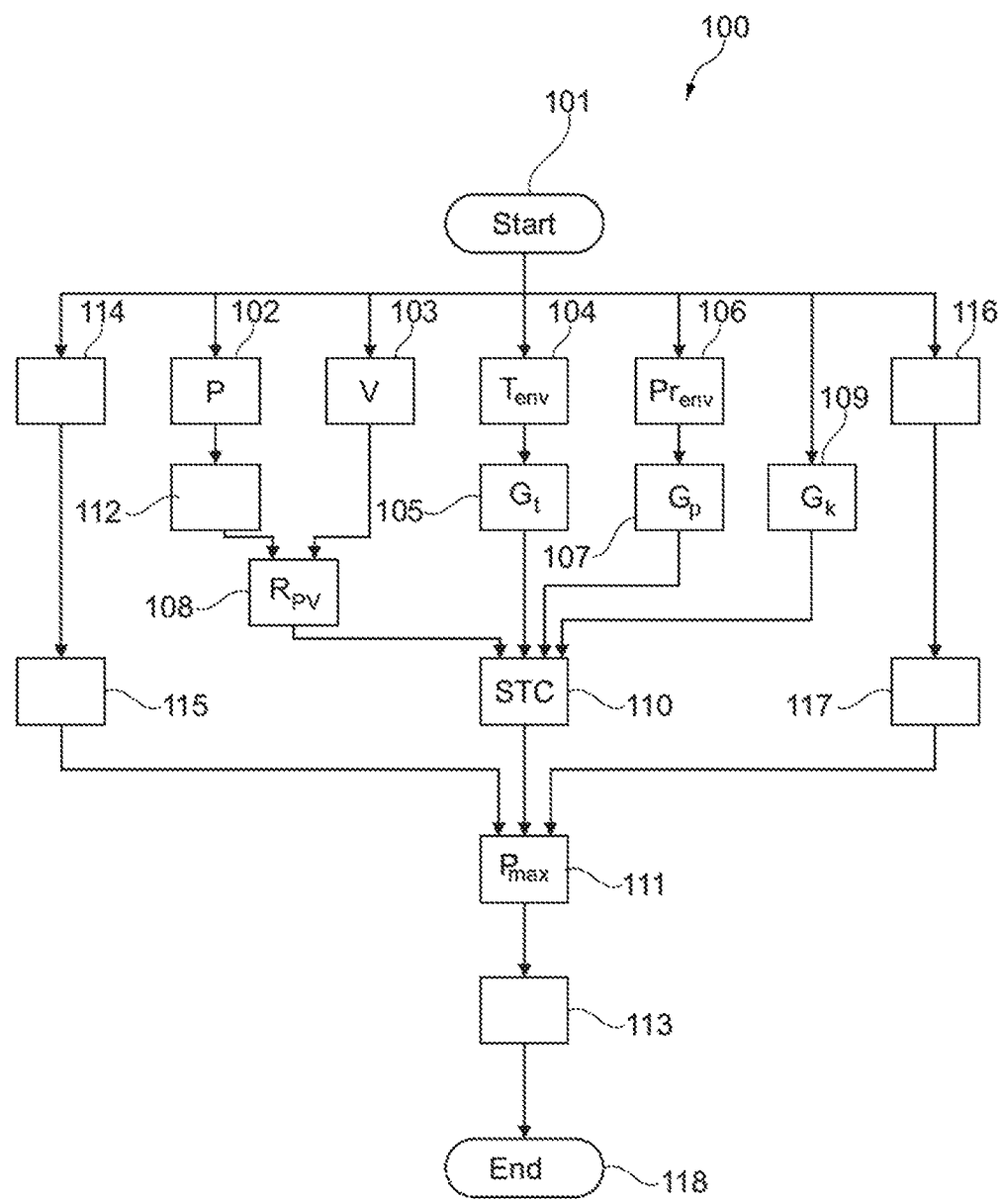
FIG. 1 shows a schematic illustrating operation of a system or method for adapting a power limitation of an internal combustion engine of a hybrid vehicle according to embodiments of the disclosure.

FIG. 1 shows a schematic illustration of operation of an example system or method for adapting a power limitation of an internal combustion engine of a hybrid vehicle according to the disclosure. In the embodiment shown, the method 100 comprises, after a starting state 101, sensing 102 of a currently supplied power level of the internal combustion engine P of the hybrid vehicle, and sensing 103 of a current velocity V of the hybrid vehicle. Furthermore, sensing 104 of an ambient temperature $T_{env}$ of the hybrid vehicle and determining 105 an associated ambient-temperature-related weighting factor $G_t$. In addition, sensing 106 of an air pressure $Pr_{env}$ in the surroundings of the hybrid vehicle, and determining 107 an associated air-pressure-related weighting factor $G_p$.

This is followed by determination 108 of a ratio $R_{pv}$ of the sensed currently supplied power P and of the sensed current velocity V. Furthermore, a vehicle-bodywork-related weighting factor $G_k$ is determined 109, wherein $G_k$ is a constant which is predefined by the design of the hybrid vehicle so that the determination can also comprise reading in $G_k$ from a memory.

On this basis, a thermal load indicator STC is determined 110 as a function of the ratio $R_{pv}$ of the sensed currently supplied power level P and the sensed current velocity V as well as of the ambient-temperature-related weighting factor $G_t$, the air-pressure-related weighting factor $G_p$ and additionally of the vehicle-bodywork-related weighting factor $G_k$. A maximum supplied power level $P_{max}$ of the internal combustion engine is then limited 111 as a function of the determined thermal load indicator STC.

In the embodiment shown, the thermal load indicator is determined 110 as STC=$R_{pv}*G_k*G_t*G_p$, i.e. as the ratio $R_{pv}$ of the sensed currently supplied power level P and of the sensed current velocity V weighted with the product of the ambient-temperature-related weighting factor $G_t$, of the air-pressure-related weighting factor $G_p$ and of the vehicle-bodywork-related weighting factor $G_k$. In this context, the ratio $R_{pv}$ is determined as $R_{pv}=P^{K1}/(V-K2)$ where K1=1.6 and K2=15 km/h, or in a preferred embodiment as $R_{pv}=P^{k1}/(MAX(V, V_{th})-K2)$ where K1=1.6, $V_{th}=17$ km/h and K2=15 km/h. The vehicle-bodywork-related weighting factor $G_k$ is determined as $G_k=1/A$, where A represents a surface of a front area of the hybrid vehicle specified in square meters, and is selected from a range from 1 to 10 depending on the design of the vehicle. The ambient-temperature-related weighting factor $G_t$ is determined as $G_t=((T_{env}+40)/K3)^2$, wherein $T_{env}$ is the ambient temperature (in degrees Celsius) and K3=70, and the air-pressure-related weighting factor $G_p$ is determined as $G_p=K4/Pr_{env}$, wherein $Pr_{env}$ is the air pressure in the surroundings of the hybrid vehicle in millibars, and K4=995 (in millibars). In the embodiment shown, the temperature load indicator is therefore determined as $$STC = \frac{P^{1.6}}{V-15} * \frac{1}{A} * \left(\frac{T_{env}+40}{70}\right)^2 * \frac{995}{Pr_{env}}$$

with numerical data which correspond to P in kilowatts, V in kilometers per hour, A in square meters, $T_{env}$ in degrees Celsius and $Pr_{env}$ in millibars, In order to filter large changes in the thermal load indicator STC, the determination 110 of the thermal load indicator STC in the embodiment shown also includes filtering the thermal load indicator by sliding averaging over a time window. The time window has here, for example, a length of 180 seconds.

In the embodiment shown, after the sensing 102 of the currently supplied power level P, the currently supplied power level P of the internal combustion engine is additionally limited 112 as a function of a permitted upper limiting value for the current velocity V of the hybrid vehicle. The permitted upper limiting value is determined here, for example, by the maximum thermal loadbearing capacity of the hybrid vehicle or an integral component thereof, but can also be determined e.g. by the maximum permissible speed, possibly lower than the latter, for the road being traveled on.

In addition to limiting 111 the maximum supplied power level $P_{max}$ of the internal combustion engine, in the embodiment shown, limiting 113 of an electrical power level supplied by means of a generator, operated by the internal combustion engine of the hybrid vehicle, is also provided.

In the embodiment shown of the method, there is additionally provision not only to limit the maximum supplied power level $P_{max}$ as a function of the determined thermal load indicator STC but also to carry out sensing 114 of a coolant temperature of the hybrid vehicle and limiting 115 of the maximum supplied power level of the internal combustion engine also as a function of the sensed coolant temperature, and sensing 116 of a torque of the internal combustion engine and limiting 117 of the maximum supplied power level of the internal combustion engine, also as a function of the sensed torque.

After the limiting 111 of the maximum supplied power level and the limitation of the supplied electrical power level 113, the method ends in a final state 118, wherein as a rule the method is immediately re-started while the hybrid vehicle is operating, and therefore continuous adaptation and/or calibration of the maximum supplied power level to the possibly changing operating circumstances are/is implemented.

Figure 2:
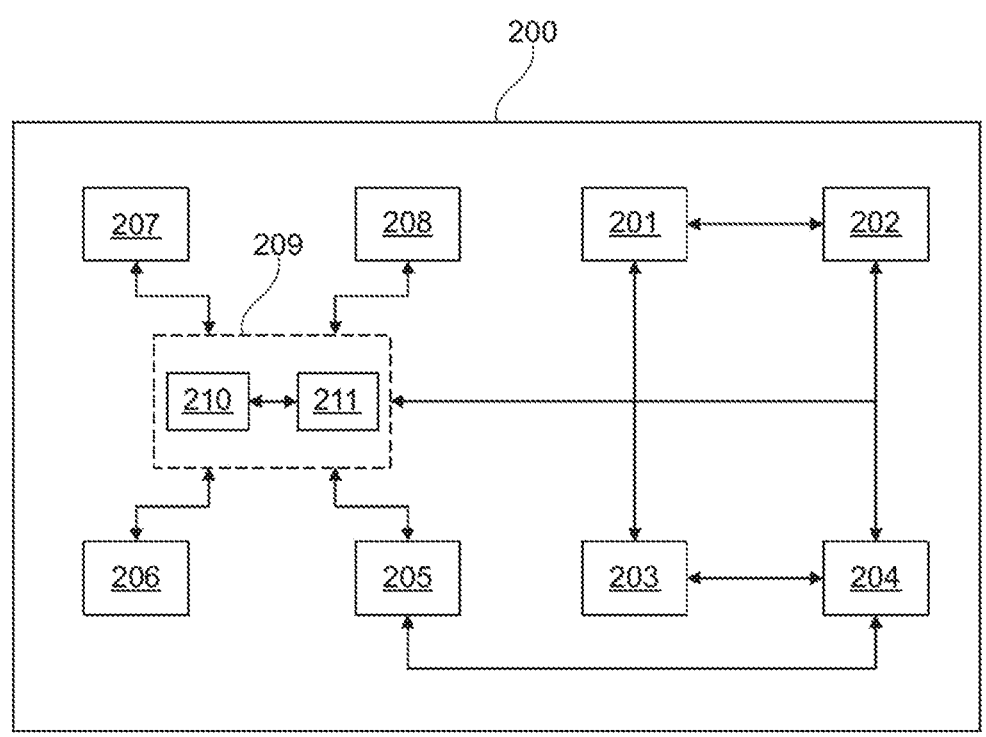
FIG. 2 shows a schematic illustrating a representative hybrid vehicle having an internal combustion engine with power limitation according embodiments of the disclosure.

FIG. 2 shows a schematic illustration of an example of a hybrid vehicle according to one or more embodiments. The hybrid vehicle 200 has an accumulator 201 and an electric motor 202 which is connected to the accumulator 201 and is configured to drive the hybrid vehicle 200. In addition, the hybrid vehicle 200 comprises a generator 203 which is connected to the accumulator 201, and an internal combustion engine 204 which is connected at least to the generator 203 and is at least configured to drive the generator 203 in order to charge the accumulator 201.

Furthermore, the hybrid vehicle 200 has a multiplicity of sensors 205, 206, 207, 208, The first sensor 205, i.e. the first sensor unit, is configured to sense a currently supplied power level P of the internal combustion engine 204. The second sensor 206 is configured to sense a current velocity V of the hybrid vehicle 200. The third sensor 207 is configured to sense an ambient temperature $T_{env}$ of the hybrid vehicle 200, and the fourth sensor 208 is configured to sense an air pressure $Pr_{env}$ in the surroundings of the hybrid vehicle 200.

In addition, the hybrid vehicle 200 has an electronic control unit 209 which is directly or indirectly communicatively connected, for example via an on-board network, to the sensors 205, 206, 207, 208 and the further vehicle components. The electronic control unit 209 is configured to carry out a method according to the first aspect of the invention. In this context, the steps of the method are carried out either by the electronic control unit 209 itself or are controlled by other components of the hybrid vehicle 200 to carry out the respective step. For this purpose, the electronic control unit 209 is configured as a programmable device at least with a memory 210 and a processor 211, wherein pieces of code are stored in the memory 210 and when they are loaded and executed by the processor 211 cause the electronic control unit 209 to carry out the control of the vehicle.

Of course, even though method steps are described in accordance with a certain ordered sequence, they could be carried out to a certain extent in a sequence other than that described. It also goes without saying that certain steps can be carried out once or repeatedly at the same time or successively, that other steps could be added or that certain steps, described here, could be omitted. In other words, the present descriptions are made available for the purpose of illustrating specific embodiments and should not be interpreted as limiting the disclosed subject matter. Similarly, while illustrated or described with respect to a single controller, various steps or functions may be distributed among multiple vehicle controllers in communication over a vehicle network.

The figures are not necessarily accurate in every detail and true to scale and could be illustrated in an enlarged or reduced fashion in order to provide a better overview. Therefore, functional details which are disclosed here are not to be understood in a limiting fashion but rather as an illustrative basis which provides a person skilled in the art in this field of technology with guidance as to how to use the present invention in a variety of ways.

The expression "and/or" used here means, when employed in a series of two or more elements, that each of the specified elements can be used alone, or any combination of two or more of the specified elements can be used. If, for example, there is a description of a combination which contains the components A, B and/or C, the combination can contain A alone, B alone, C alone, A and B in combination, A and C in combination, B and C in combination or A, B and C in combination.

Although various embodiments have been illustrated and described in detail, the claimed subject matter is not limited by the disclosed examples and other variations may be derived therefrom by a person skilled in the art without departing from the scope of the claimed subject matter.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A method of controlling a vehicle having an internal combustion engine, a traction battery, and an electric machine configured to propel the vehicle, the method comprising:
   sensing a currently supplied power level of the internal combustion engine and a current velocity of the vehicle;
   sensing an ambient temperature and determining, by a vehicle controller, an associated ambient-temperature-related weighting factor;
   sensing an ambient air pressure of the vehicle and determining, by the vehicle controller, an associated air-pressure-related weighting factor;
   determining, by the vehicle controller, a thermal load indicator based on the sensed currently supplied power level, current vehicle velocity, the ambient-temperature-related weighting factor, the air-pressure-related weighting factor, and a vehicle-bodywork-related weighting factor; and
   limiting, by the vehicle controller, a maximum supplied power level of the internal combustion engine based on the thermal load indicator
   wherein the thermal load indicator is determined by a ratio of the currently supplied power level and the current velocity of the vehicle multiplied by the ambient-temperature-related weighting factor, the air-pressure-related weighting factor, and the vehicle-bodywork-related weighting factor.

2. The method of claim 1 wherein, when the current velocity (V) of the vehicle exceeds a vehicle velocity threshold, determining the ratio comprises determining the ratio (R) according to $R=P^{K1}/(V-K2)$, where P represents the currently supplied power level of the internal combustion engine, K1 is a first constant factor in a range between 1 and 2, and K2 is a second constant factor higher than zero and lower than the vehicle velocity threshold.

3. The method of claim 2, wherein determining the ratio (R) comprises determining R according to $R=P^{K1}/(MAX(V, V_{th})-K2)$, where MAX selects the maximum of the vehicle velocity V and the vehicle velocity threshold $V_{th}$.

4. The method of claim 3 wherein the first constant factor K1=1.6.

5. The method of claim 3 wherein the second constant factor K2=15 kilometers per hour.

6. The method of claim 2 wherein determining the ambient-temperature-related weighting factor ($G_t$) comprises determining $G_t=((T_{env}+40)/K3)^2$, wherein $T_{env}$ is the ambient temperature in degrees Celsius, and K3 is a third constant factor which is greater than 60 and lower than 80.

7. The method of claim 6 wherein the third constant factor K3=70.

8. The method of claim 6 wherein determining the air-pressure-related weighting factor ($G_p$) comprises determining $G_p=K4/Pr_{env}$, wherein $Pr_{env}$ is the ambient air pressure in millibars, and K4 is a fourth constant factor which is greater than 900 and less than 1100.

9. The method of claim 1 wherein the vehicle-bodywork-related weighting factor depends on a surface area of a front portion of the vehicle.

10. The method of claim 9 wherein the vehicle-bodywork-related weighting factor corresponds to 1/A, where A is a constant between 1 to 10 specified in square meters.

11. The method of claim 1 wherein determining the thermal load indicator comprises mean value filtering during which the thermal load indicator is filtered by sliding averaging over a time window.

12. The method of claim 1 further comprising limiting electrical power supplied by the electric machine based on the thermal load indicator.

13. A vehicle comprising:
   an internal combustion engine;
   an electric machine mechanically coupled to the internal combustion engine;
   a traction battery electrically connected to the electric machine; and
   a controller configured to limit a maximum supplied power level of the internal combustion engine in response to a thermal load indicator calculated by the controller, the thermal load indicator corresponding to a ratio of a currently supplied power level of the internal combustion engine and current vehicle velocity multiplied by: an ambient temperature related weighting factor, an ambient air pressure related weighting factor, and a weighting factor associated with surface area of a front portion of the vehicle.

14. The vehicle of claim 13 wherein the controller is further configured to limit electric power supplied by the electric machine based on the thermal load indicator.

15. The vehicle of claim 14 wherein, in response to the current vehicle velocity exceeding a vehicle velocity threshold ($V_{th}$), the controller calculates the thermal load indicator according to a ratio (R) where $R=P^{K1}(V-K2)$, where P represents the currently supplied power level of the internal combustion engine, K1 is a first constant factor in a range between 1 and 2, and K2 is a second constant factor higher than zero and lower than the vehicle velocity threshold.

16. The vehicle of claim 14 wherein the controller is further configured to calculate the ratio (R) according to $R=P^{K1}/(MAX(V, V_{th})-K2)$, where MAX selects the maximum of the current vehicle velocity V and a vehicle velocity threshold $V_{th}$, and K2 is a constant factor higher than zero and lower than $V_{th}$.

17. A vehicle comprising:
   an internal combustion engine;

an electric machine mechanically coupled to the internal combustion engine and configured to selectively propel the vehicle;
an ambient temperature sensor;
an ambient air pressure sensor;
a vehicle velocity sensor;
a traction battery electrically connected to the electric machine; and
a controller receiving signals from the ambient temperature sensor, the ambient air pressure sensor, and the vehicle velocity sensor, the controller configured to limit a maximum supplied power level of the internal combustion engine and to limit a maximum supplied electrical power from the electric machine in response to a thermal load indicator (STC) calculated by the controller, the thermal load indicator based on a ratio of a currently supplied power level of the internal combustion engine to a current velocity of the vehicle multiplied by: an ambient-temperature-related weighting factor, an ambient-air-pressure-related weighting factor, and a vehicle-bodywork-related weighting factor, the vehicle-bodywork-related weighting factor based on surface area of a front portion of the vehicle.

18. The vehicle of claim 17 wherein the controller is configured to calculate the ratio (R) according to: $R = P^{K1}/(V-K2)$, where P represents the currently supplied power level of the internal combustion engine, V represents the current velocity of the vehicle, K1 is a first constant factor in a range between 1 and 2, and K2 is a second constant factor higher than zero and lower than a vehicle velocity threshold.

* * * * *